(12) United States Patent
Leman

(10) Patent No.: US 6,201,688 B1
(45) Date of Patent: Mar. 13, 2001

(54) APPARATUS FOR SECURING A LAPTOP COMPUTER

(75) Inventor: Michael V. Leman, Eagle, ID (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 09/167,170

(22) Filed: Oct. 6, 1998

(51) Int. Cl.⁷ .................................................. G06F 1/16
(52) U.S. Cl. ..................... 361/681; 361/726; 248/918; 345/905
(58) Field of Search .................. 361/681, 683, 361/726, 682; 292/163; 248/917, 924; 345/905; D14/106; 364/708.1

(56) References Cited

U.S. PATENT DOCUMENTS

| | | | |
|---|---|---|---|
| D. 398,291 | * 9/1998 | Suzuki | D14/106 |
| D. 430,870 | * 9/2000 | Maruyama et al. | D14/106 |
| 5,193,069 | 3/1993 | Furuya . | |
| 5,198,966 | * 3/1993 | Kobayashi et al. | 361/681 |
| 5,345,403 | * 9/1994 | Ogawa et al. | 364/708.1 |
| 5,379,182 | * 1/1995 | Fujimori et al. | 361/681 |
| 5,465,191 | * 11/1995 | Nomura et al. | 361/681 |
| 5,497,296 | * 3/1996 | Satou et al. | 361/681 |
| 5,576,929 | * 11/1996 | Uchiyama et al. | 292/163 |
| 5,644,469 | 7/1997 | Shioya et al. . | |
| 5,742,475 | * 4/1998 | Riddiford | 361/681 |
| 5,768,096 | * 6/1998 | Williams et al. | 361/681 |
| 5,777,704 | 7/1998 | Selker . | |
| 6,008,983 | * 12/1999 | Yen | 361/681 |
| 6,016,171 | * 1/2000 | Tsao | 361/681 |
| 6,044,473 | * 3/2000 | Kim | 361/681 |
| 6,094,341 | * 7/2000 | Lin | 361/681 |
| 6,122,152 | * 9/2000 | Goto et al. | 361/681 |
| 6,125,040 | * 9/2000 | Nobuchi et al. | 361/681 |

OTHER PUBLICATIONS

Catalog Item "New Dell® Latitude® CPi," Dell® Business Catalog, Jul. 1998, pp. 14–15.

* cited by examiner

Primary Examiner—Gregory Thompson
Assistant Examiner—Lea Edmonds
(74) Attorney, Agent, or Firm—Perkins Coie LLP

(57) ABSTRACT

An apparatus for securing a display housing to a base of a laptop computer. In one embodiment, the base has a width-wise dimension, a depthwise dimension, and a thickness and the display housing has a depthwise dimension that exceeds the depthwise dimension of the base. The laptop computer can further include a latch coupled to at least one of the display housing and the base. The latch can have an engaging portion that moves between a secured position to secure the display housing to the base, and an unsecured position to allow the display housing to be pivoted away from the base. The latch can translate or rotate between the secured position and the unsecured position.

45 Claims, 8 Drawing Sheets

US 6,201,688 B1

APPARATUS FOR SECURING A LAPTOP COMPUTER

TECHNICAL FIELD

The present invention is directed to an apparatus for securing a display housing to a base of a laptop computer.

BACKGROUND OF THE INVENTION

Laptop computers are portable computers that generally operate from either external or portable power sources. Conventional laptop computers typically have a base pivotally connected to a display housing. The base typically includes a primary input device, such as a keyboard, and a secondary input device, such as a computer mouse, roller ball or touch pad. The display housing typically includes a liquid crystal display (LCD) or other type of display. To access the keyboard and the display, a user positions the base on a surface (e.g., the user's lap or a fixed surface) and opens the computer by pivoting the display housing away from the base. To close and easily transport the computer after use, the user pivots the display housing toward the base and secures the housing to the base.

In conventional laptop computers, the display housing is generally relatively small so that the laptop computer can be easily transported. One drawback with this arrangement is that text and graphics on the display may be difficult to visually discern. Accordingly, it may be difficult to use the laptop computer.

One means for addressing this drawback is to enlarge the size of the display housing while keeping the size of the base approximately the same. Accordingly, the display can be made larger and easier to read without unnecessarily increasing the weight of the computer by also increasing the size of the base. However, one drawback with this approach is that it may be difficult to latch or otherwise secure the oversized display housing to the base. For example, it may be difficult to latch a display that overhangs the base without using a relatively complex mechanism that can be cumbersome and/or heavy. Another drawback is that the portion of the oversized display that overhangs the base is exposed even when the laptop computer is closed. Accordingly, the display may be susceptible to damage when the laptop computer is transported.

SUMMARY OF THE INVENTION

The present invention is directed toward laptop computers and latches for laptop computers. In one aspect of the invention, the laptop computer has a base with a widthwise dimension, a first depthwise dimension, and a thickness. The laptop computer can further include a display housing having a second depthwise dimension that exceeds the first depthwise dimension of the base. The display housing can be pivotally coupled to the base and movable relative to the base between a stowed position in which a first surface of the display housing faces the base and an unstowed position in which the first surface is accessible to a user. The laptop computer further can include a latch member coupled to at least one of the display housing and the base. The latch member can include an engaging portion that is movable between a secured position and an unsecured position. The engaging portion is removably engaged with the other of the display housing and the base when the latch member is in the secured position to secure the display housing to the base.

The latch member can have several different configurations. For example, in one aspect of the invention, the latch member can be slidably coupled to the display housing. In a further aspect of the invention, the latch member can include a cavity that receives a corresponding projection of the base, or the latch member can include a projection that is removably received by a corresponding cavity of the base when the latch member is in the secured position. In another aspect of the invention, the latch member can be pivotably coupled to either the display housing or the base to engage the other of the display housing and the base when the latch member is in the secured position.

DETAILED DESCRIPTION OF THE INVENTION

The present disclosure describes laptop computers having an oversized display housing releasably secured to a base. In one embodiment, the display housing can include a latch that slides relative to the display housing to secure the display housing to the base. In another embodiment, the display housing can include a latch that pivots to secure the display housing to the base. Many specific details of certain embodiments of the invention are set forth in the following description and in FIGS. 1–7 to provide a thorough understanding of such embodiments. One skilled in the art, however, will understand that the present invention can have additional embodiments and can be practiced without several of the details described in the following description.

Figure 1:
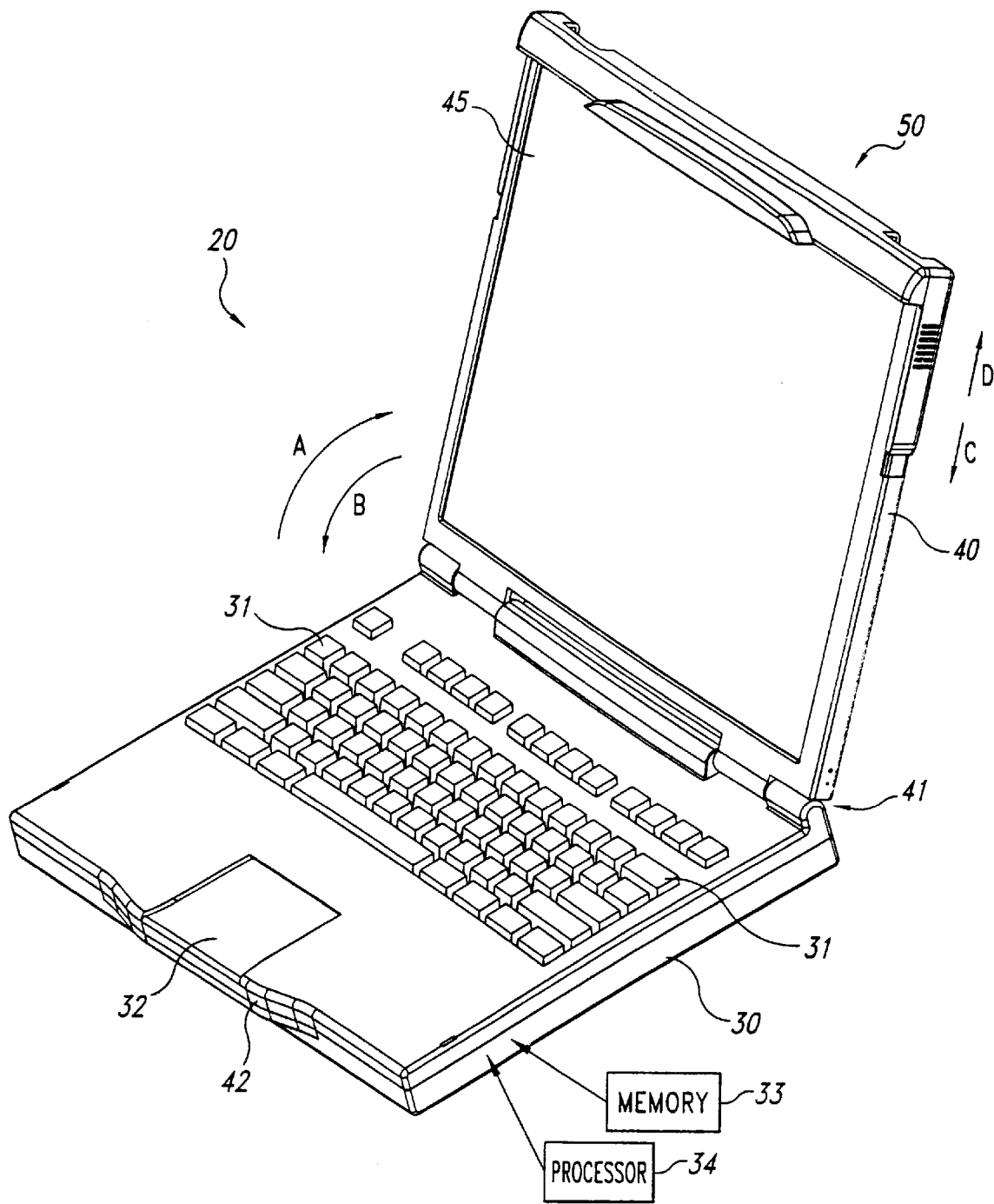
FIG. 1 is a top isometric view of a laptop computer having an oversized display housing that can be releasably latched to a base of the laptop computer in accordance with an embodiment of the invention.

FIG. 1 is a top isometric view of a laptop computer 20 having a display housing 40 pivotably coupled to a base 30 by a pivot joint 41. The base 30 can include a plurality of input keys 31 and a touch pad 32 or other input device, such as a roller ball, mouse or joystick. The base can further include a memory 33 and a processor 34, both shown schematically in FIG. 1. The display housing 40 can include a display 45, such as an LCD screen, a field emission display or another visually accessible display device. The display housing 40 can be pivoted away from the base 30 to an unstowed position (arrow A), and it can be pivoted toward the base 30 to a stowed position (arrow B).

The display housing 40 can also include a latch 50 to releasably secure the display housing 40 to the base 30. For example, when the display housing 40 is in the stowed position, the latch 50 can be translated toward the pivot joint 41 (arrow C) to engage a corresponding projection 42 of the base 30 and secure the display housing 40 to the base 30. The latch 50 can also be translated in the opposite direction (arrow D) to release the display housing 40 from the base 30 and allow the display housing 40 to be pivoted to the unstowed position.

Figure 2:
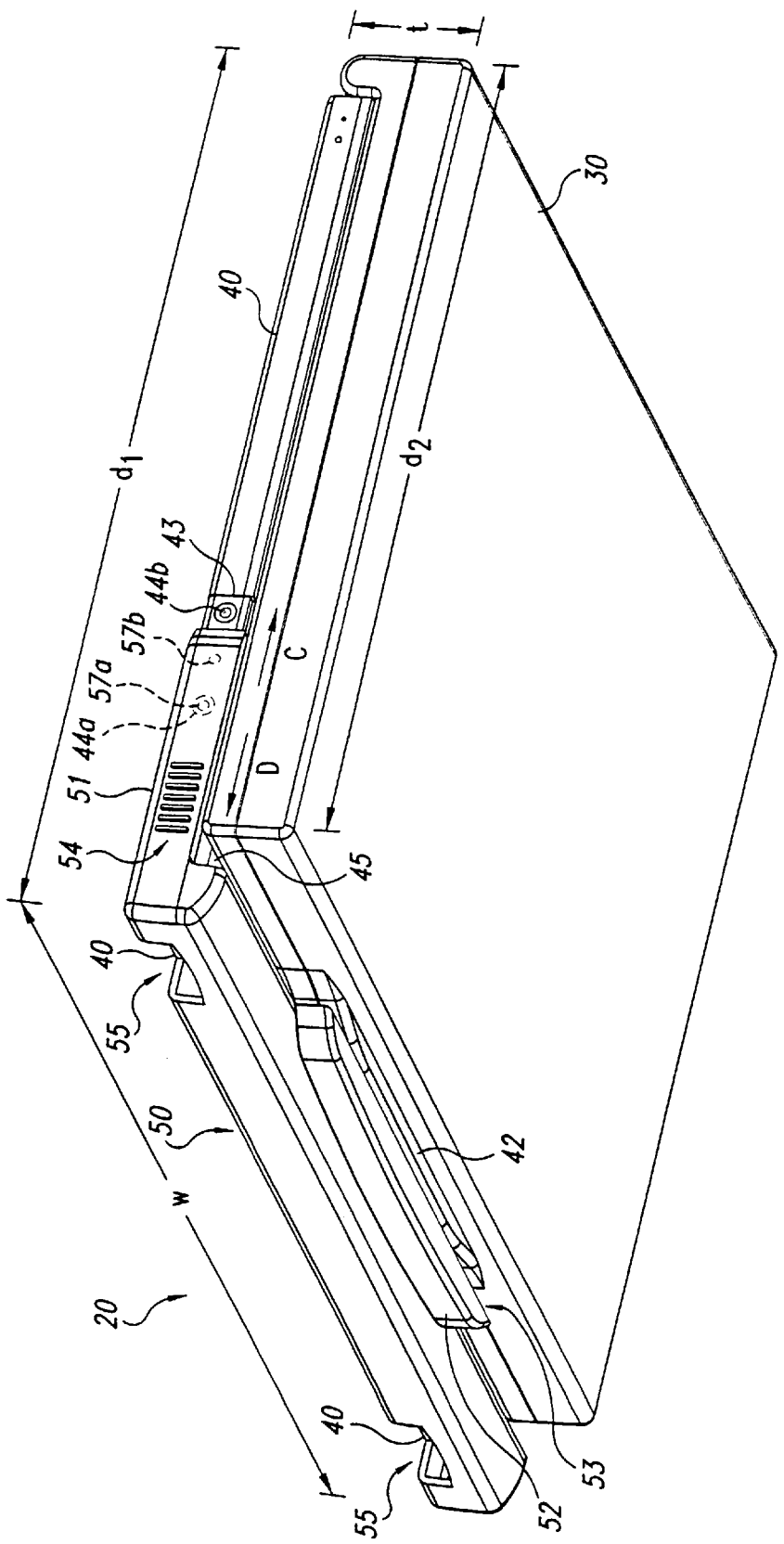
FIG. 2 is a bottom isometric view of the computer of FIG. 1 with the display housing folded toward the base.

FIG. 2 is a bottom isometric view of the laptop computer 20 shown in FIG. 1. The laptop computer 20 has an overall width w, an overall depth $d_1$, and an overall thickness t. As shown in FIG. 2, the overall depth $d_1$ is also the depth of the display housing 40, and exceeds a depth $d_2$ of the base 30 so that a forward portion of the display housing 40 overhangs the base 30. In other embodiments, other portions of the display housing 40 can overhang other portions of the base 30 (e.g., side or rear portions of the base 30).

In one embodiment, the latch 50 includes an attachment portion 51 slidably coupled to the overhanging forward portion of the display housing 40. For example, the attachment portion 51 can be configured to slide along a guide rail 43 of the display housing 40 between an unsecured position (shown in FIG. 2) and a secured position. The attachment portion 51 can include a locking device to hold the latch 50 in the secured position and/or the unsecured position. For example, the locking device can include two detents 57 (shown in FIG. 2 as a forward detent 57a and a rear detent 57b) that engage corresponding detent apertures 44 (shown as a forward detent aperture 44a and a rear detent aperture 44b) on the guide rail 43. When the forward detent 57a is received in the forward detent aperture 44a, the latch 50 is releasably held in the unsecured position (shown in FIG. 2). When the rear detent 57b is received in the rear detent aperture 44b, the latch 50 is releasably held in the secured position.

The attachment portion 51 can further include finger grips 54 (one of which is shown in FIG. 2) having ribs or other texture elements to engage a user's fingers (not shown). The attachment portion 51 can also have access openings 55 through which the display housing 40 is accessible. Users can engage the display housing 40 through the access openings 55 with the thumbs of each hand while engaging the finger grips 54 with the index fingers of each hand. The users can then draw their index fingers toward them to move the latch 50 in the direction indicated by arrow D from the secured position to the unsecured position. In other embodiments, users can use other fingers to manipulate the latch 50.

The latch 50 can further include an engaging portion 52 that engages the base 30 when the latch 50 is in the secured position. In one embodiment, the engaging portion 52 includes a cavity 53 configured to receive the protrusion 42 of the base 30 when the latch 50 is moved in the direction indicated by arrow C from the unsecured position (shown in FIG. 2) to the secured position. In other embodiments, the engaging portion 52 can have other configurations, as will be discussed in greater detail below with reference to FIGS. 3–7.

Operation of an embodiment of the laptop computer 20 is best understood with reference to FIGS. 1 and 2. Beginning with FIG. 2, users can disengage the display housing 40 from the base 30 by contacting the display housing 40 through the access openings 55 of the latch 50. Users can then slide the latch 50 in the direction indicated by arrow D, as discussed above, until the engaging portion 52 disengages from the protrusion 42. At this point, the forward detent 57a is received in the forward detent aperture 44a to prevent users from inadvertently moving the latch 50 away from the unsecured position.

Referring now to FIG. 1, users can pivot the display housing 40 (arrow A) to its unstowed position to view the display 45 and access the input keys 31 and input device 32. When the display housing 40 is moved to its unstowed position and the latch 50 is moved to its unsecured position, the latch 50 does not overlap the display 45, so that the entire display 45 is accessible for viewing.

To stow and secure the display housing 40, users can pivot the display housing 40 toward the base 30 (arrow B). Once the display housing 40 is folded flat against the base 30 (FIG. 2), users can slide the latch 50 in the direction indicated by arrow C until the cavity 53 receives the protrusion 42 and the rear detent aperture 44b receives the rear detent 57b. When the latch 50 secures the display housing 40 to the base 30 in the stowed position, the display housing 40 cannot be easily pivoted away from the base 30. Furthermore, when the latch 50 is in the secured position, it can cover the portion of the display 45 that overhangs the base 30.

One advantage of the laptop computer 20 shown in FIGS. 1 and 2 is that the latch 50 can easily secure the display housing 40 to the base 30 even though the oversized display housing 40 overhangs the base 30. Moreover, because the latch 50 can be movably attached directly to the overhanging portion of the display housing 40, another advantage is that the latch 50 can cover the portion of the display 45 overhanging the base 30 to protect the display 45 when the display housing 40 is in the stowed position. Furthermore, when the latch 50 is moved to the unsecured position, it does not obstruct the display 45, allowing the user to take full advantage of the increased size of the display 45.

Still a further advantage is that the latch 50 can include detents 57 to hold the latch 50 in either the secured position or the unsecured position. This is advantageous because it reduces the likelihood that the latch 50 will inadvertently slip from the unsecured position to a position where it can obscure a portion of the display 45. In addition, the detents 57 reduce the likelihood that the latch 50 will slip from the secured position, which may cause the laptop computer 20 to inadvertently open.

Yet another advantage is that the latch 50 can include access openings 55 that allow users to more easily move the latch 50 from the secured position to the unsecured position. For example, because users can brace their fingers against the display housing 40 by contacting the display housing 40 through the access openings 55, the users can more readily move the latch 55 relative to the display housing 40.

Figure 3:
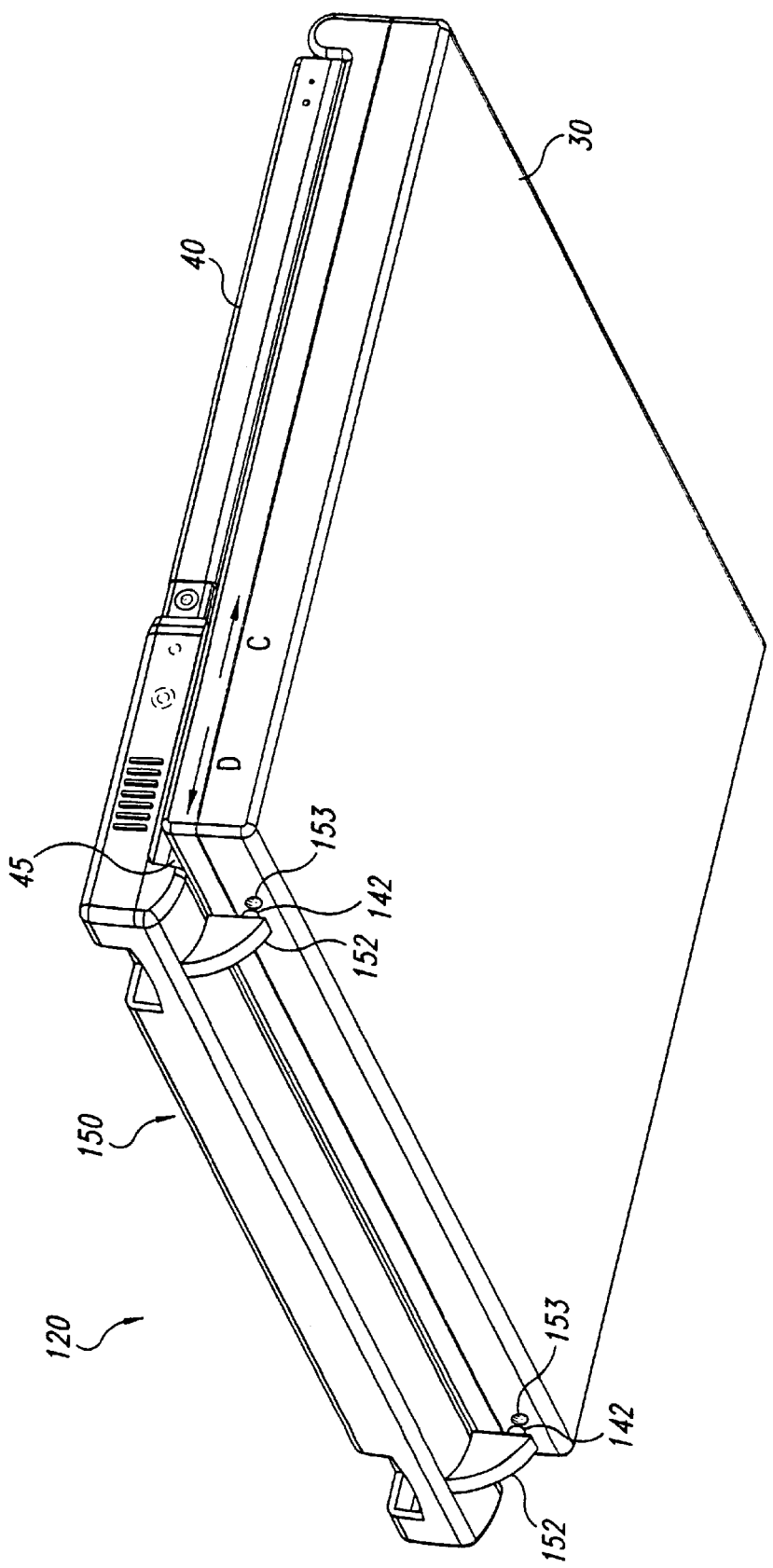
FIG. 3 is a bottom isometric view of a laptop computer having an oversized display housing releasably secured to a base in accordance with another embodiment of the invention.

FIG. 3 is a bottom isometric view of a laptop computer 120 having a latch 150 with two engaging portions 152 in accordance with another embodiment of the invention. As is shown in FIG. 3, each engaging portion 152 includes a projection 142 that can be removably inserted into a corresponding cavity 153 of the base 30. Accordingly, the latch 150 can be translated away from the base 30 (arrow D) to move the latch 150 to the unsecured position. When in the unsecured position, the projections 142 are disengaged from the corresponding cavities 153 and the display 45 can be pivoted away from the base 30. The latch 150 can also be translated toward the base 30 (arrow C) to the secured position to secure the display housing 40 to the base 30 in the stowed position.

Figure 4:
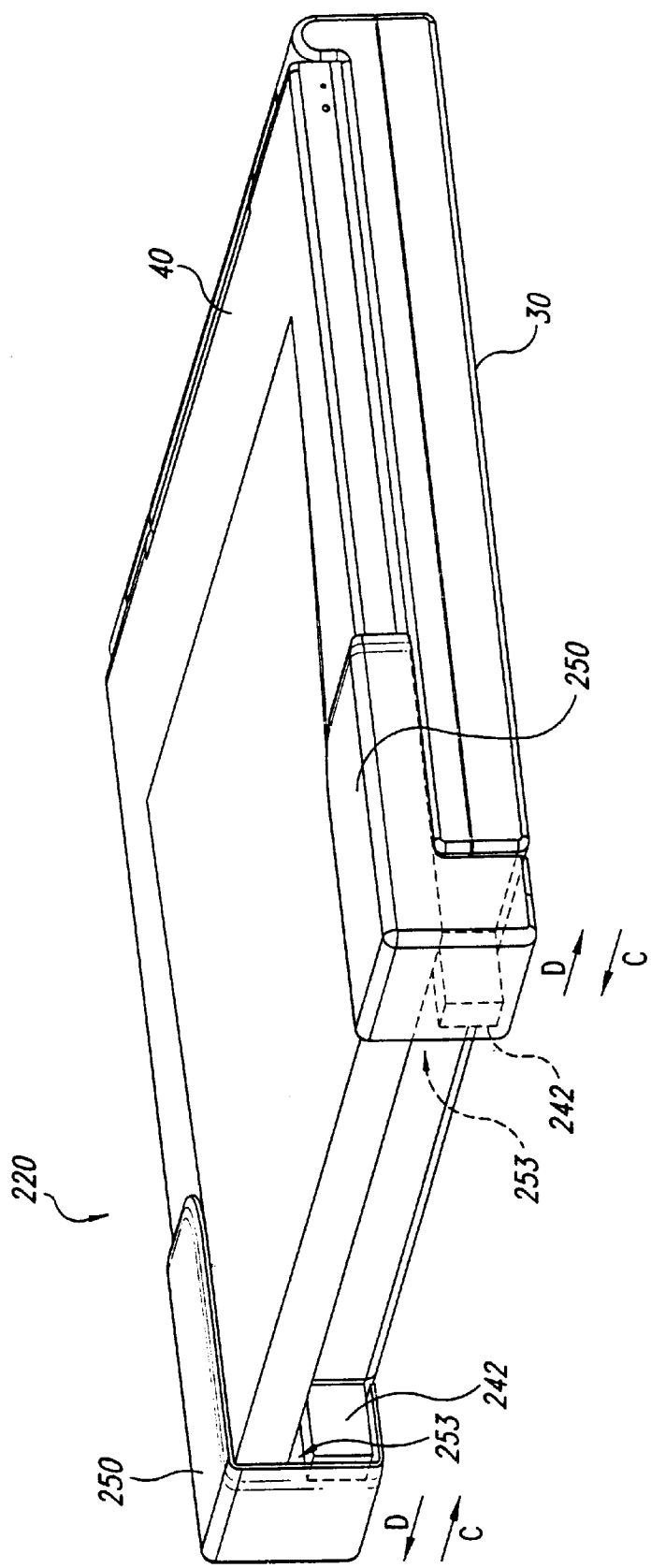
FIG. 4 is a top isometric view of a laptop computer having an oversized display housing releasably secured to a base in accordance with still another embodiment of the invention.

FIG. 4 is a top isometric view of a laptop computer 220 having two latches 250 that slide transversely in accordance with another embodiment of the invention. As shown in FIG. 4, each of the latches 250 can include a cavity 253 that removably receives a corresponding projection 242 of the base 30. When the latches 250 are in the secured position (shown in FIG. 4), the projections 242 are received in the cavities 253. To move the latches 250 to their unsecured positions, users can slide the latches away from the base 30 (arrow D) until the projections 242 are clear of the cavities 253. At that point, the display housing 40 can be pivoted away from the base 30 to operate the computer.

An advantage of the laptop computer 220 shown in FIG. 4 is that the latches 250 may be smaller, and therefore less costly to manufacture than the latches 50 and 150 shown in FIGS. 1–3. Conversely, an advantage of the latches 50 and 150 shown in FIGS. 1–3 is that they extend across the entire width w (FIG. 2) of the laptop computer to protect the display 45 (FIGS. 1–3) when the display housing 40 is in the stowed position.

Figure 5A:
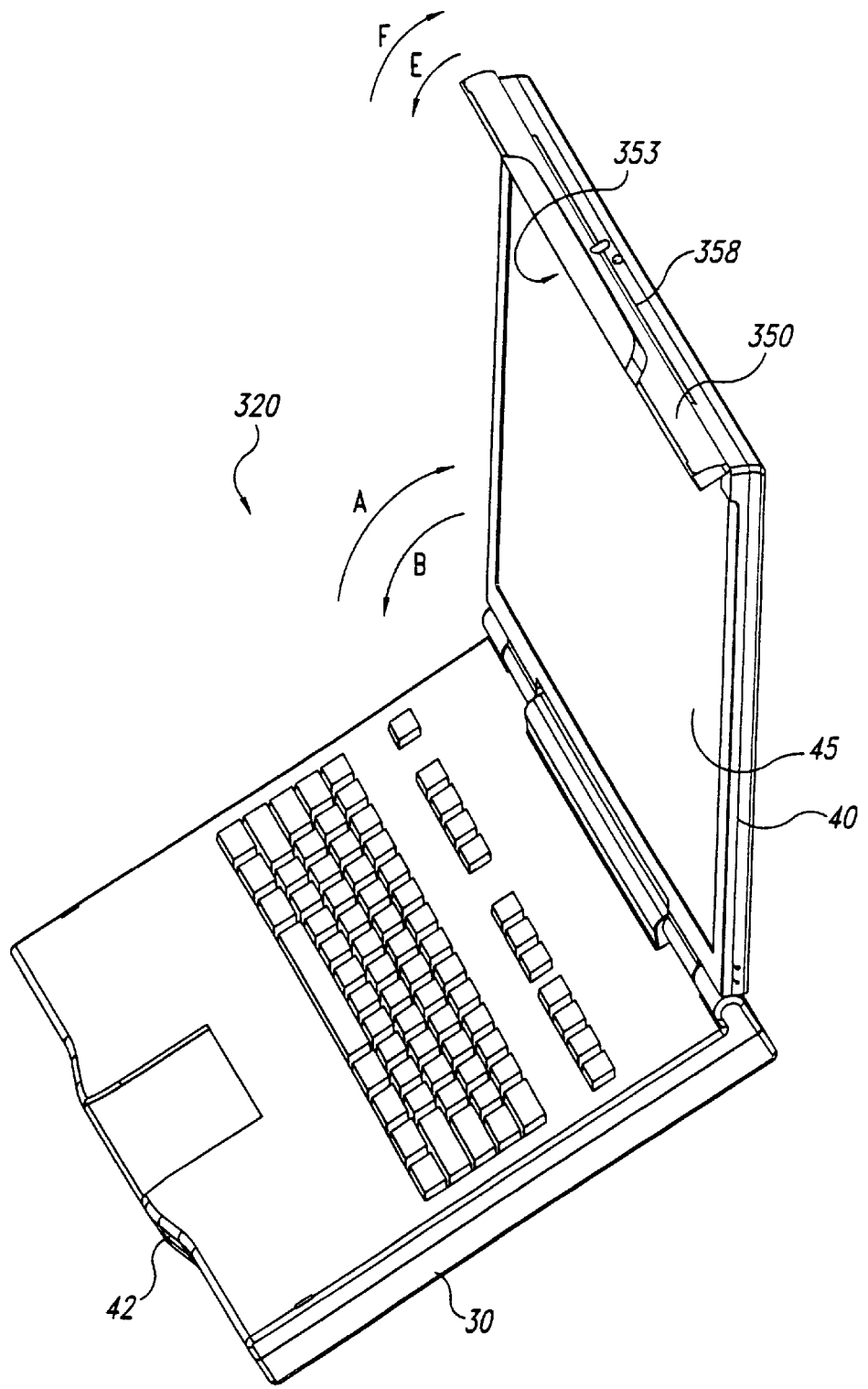
FIG. 5A is a top isometric view of a laptop computer having an oversized display housing with a pivotal latch that releasably secures the display housing to a base of the laptop computer in accordance with yet another embodiment of the invention.

FIG. 5A is a top isometric view of a laptop computer 320 having a latch 350 that pivots between the secured position and the unsecured position in accordance with yet another embodiment of the invention. In one embodiment, the latch 350 is pivotably connected to a forward edge of the display housing 40 with a latch pivot 358. The latch 350 can be pivoted relative to the display housing 40 and away from the base 30 (arrow F) to the unsecured position to expose the display 45. The latch 350 can be pivoted in the opposite direction toward the base 30 (arrow E) to secure the display housing 40 to the base 30.

Figure 5B:
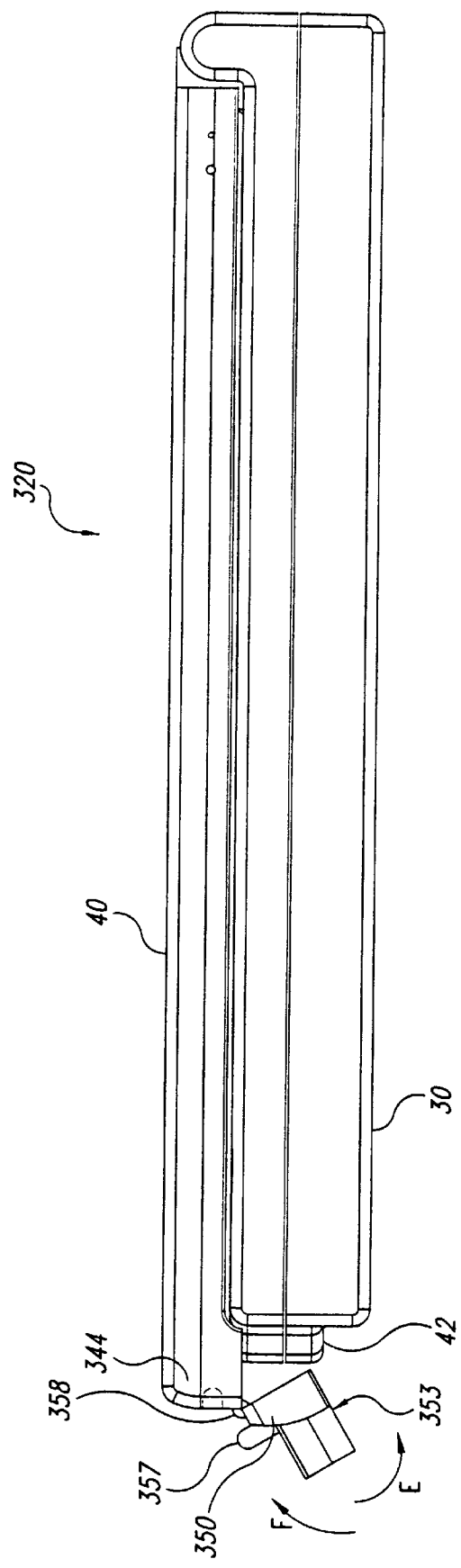
FIG. 5B is a side elevation view of the laptop computer shown in FIG. 5A with the display housing folded toward the base.

FIG. 5B is a side elevation view of the laptop computer 320 shown in FIG. 5A. As shown in FIG. 5B, the display housing 40 is folded against the base 30 in the stowed position, and the latch 350 is shown in transition between the unsecured position and the secured position. In one embodiment, the latch 350 can include a cavity 353 that removably receives the projection 42 of the base 30 when the latch 350 is in the secured position. In a further aspect of this embodiment, walls of the cavity 353 can be configured to frictionally engage the projection 42 so that the latch 350 is not inadvertently pivoted away from the secured position. In still a further aspect of this embodiment, the latch 350 can include a detent 357 that is removably received in a detent aperture 344 when the latch 350 is moved to the unsecured position. Accordingly, the latch 350 can be prevented from inadvertently rotating in front of the display 45 (FIG. 5A) where it might obscure visibility of the display 45.

Figure 6:
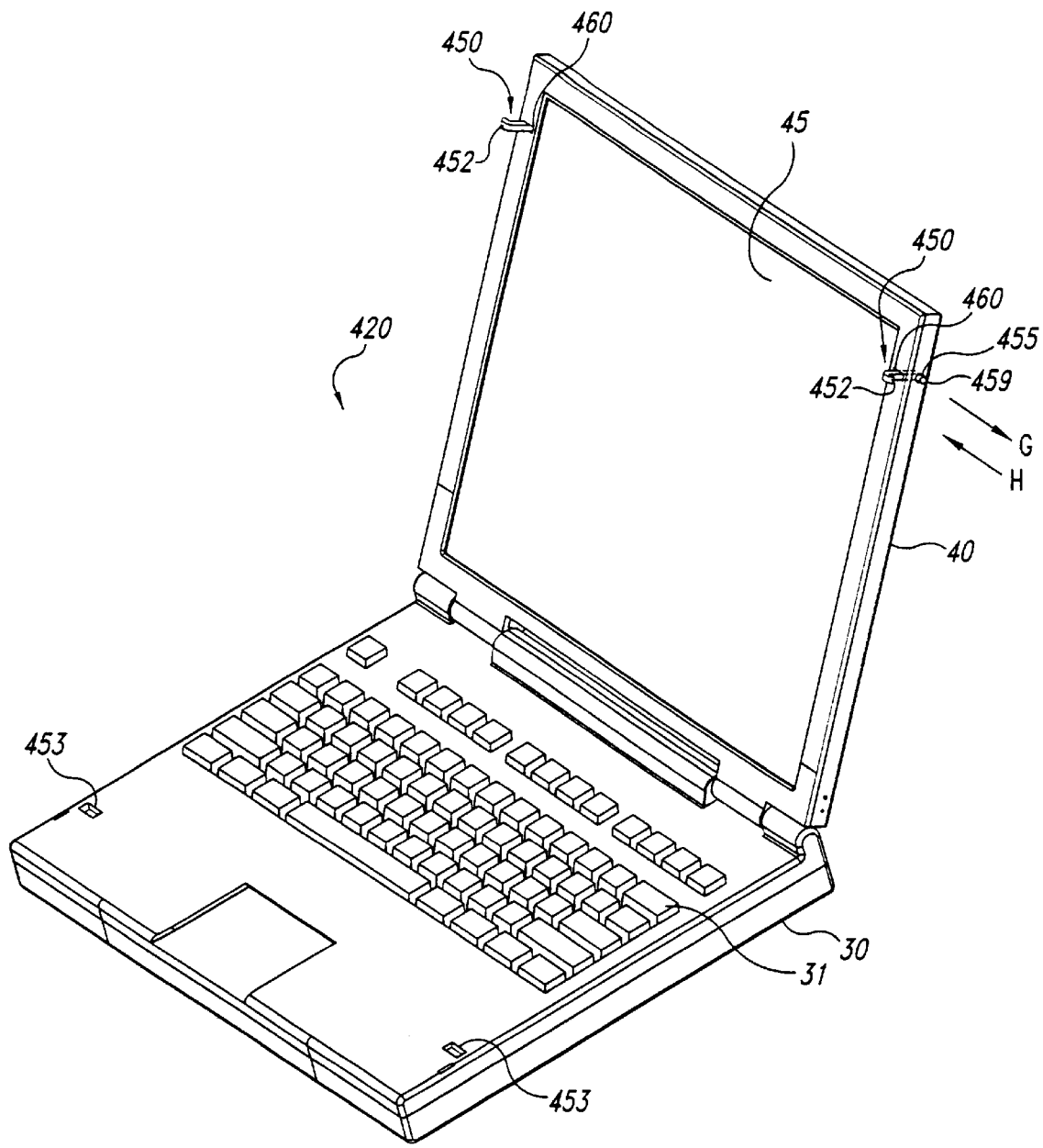
FIG. 6 is a top isometric view of a laptop computer having an oversized display housing that can be releasably secured to a base with a latch in accordance with still another embodiment of the invention.

FIG. 6 is a top isometric view of a laptop computer 420 in accordance with another embodiment of the invention having a pair of latches 452 in the display housing 40 that can be received in a corresponding pair of cavities 453 in the base 30. In one aspect of the embodiment shown in FIG. 6, each latch 450 can include a hook-shaped engagement portion 452 that slides transversely in a slot 460 of the display housing 40. When the latch 450 is in the secured position, the hook-shaped engagement portion 452 engages the walls of the corresponding cavity 453.

Each engagement portion 452 can be coupled to a contact portion 459 that is in turn accessible to users through an access opening 455 in the display housing 40. When users press the contact portions 459 inward (arrow H), the engagement portions 452 move inwardly into the display housing 40 to the unsecured position. When users release the contact portions 459, the engagement portions 452 slide outwardly with respect to the display housing 40 (arrow G). Accordingly, when the display housing 40 is closed against the base 30, the engagement portions 452 other latches 450 can hook under the top panel of the base 30 in the secured position. In one embodiment, the latches 450 can be spring-loaded or otherwise biased toward the secured position.

Figure 7:
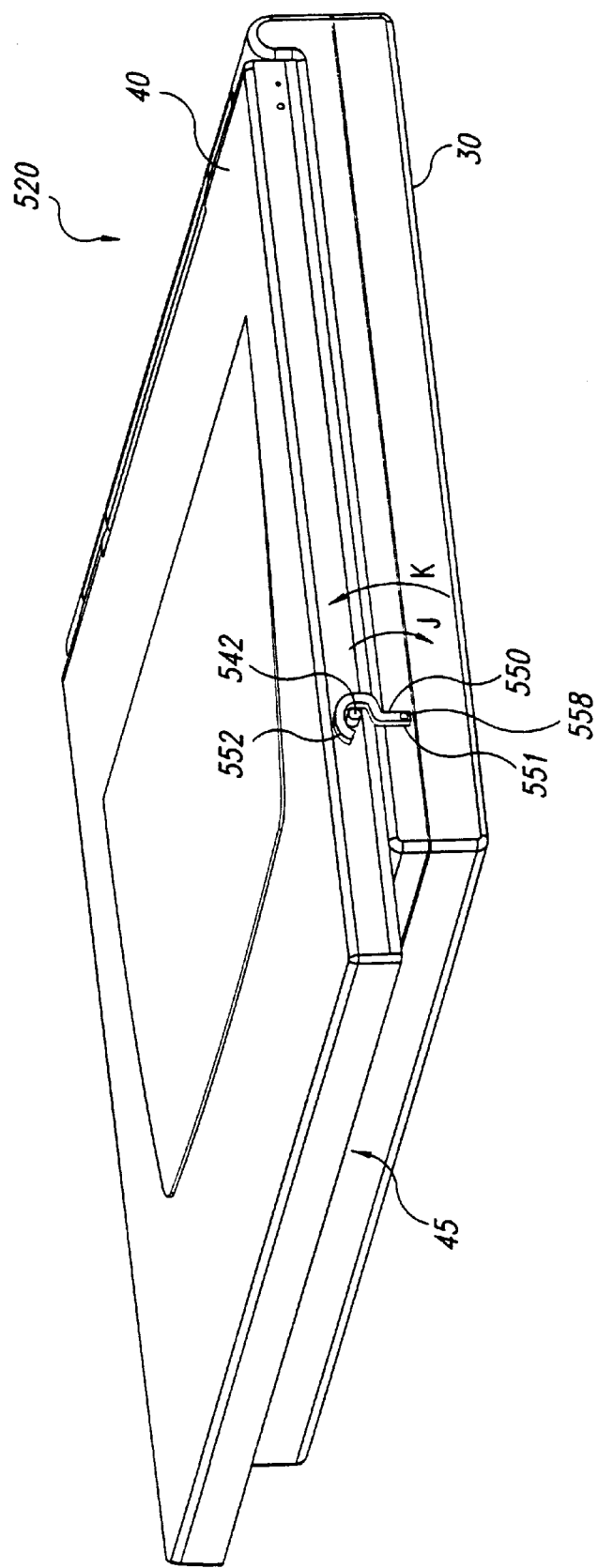
FIG. 7 is a top isometric view of a laptop computer having an oversized display housing secured to a base with a latch in accordance with yet another embodiment of the invention.

FIG. 7 is a side isometric view of a laptop computer 520 having a pair of latches 550 (one of which is shown in FIG. 7) in accordance with still another embodiment of the invention. As shown in FIG. 7, each latch 550 can include an attachment portion 551 that is pivotally attached to the base 30 with a latch pivot pin 558 to allow the latch 550 to rotate relative to the display housing 40 (arrows J and K). Each latch 550 can further include an engaging portion 552 that is configured to releasably engage a corresponding projection 542 extending away from the display housing 40. When the latch 550 is rotated in the direction indicated by arrow K, the engaging portion 552 engages the projection 542 and secures the display housing 40 to the base 30. When the latch 550 is rotated in the direction indicated by arrow J, the engaging portion 552 releases the projection 542 and the display housing 40 can be moved to the unstowed position.

In one aspect of this embodiment, the engaging portion 552 can have a hook shape to releasably engage the projection 542. In still a further aspect of this embodiment, the engaging portion 552 can include an elastic, resilient material that can be elastically deformed to snap over and around the projection 542 to position the latch 550 in the secured position. The engaging portion 552 can be similarly elastically deformed to move the latch 550 away from the projection to the unsecured position.

An advantage of the latch 550 shown in FIG. 7 is that it does not depend from the display housing 40, and accordingly may be less likely to block any portion of the display 45. Conversely, an advantage of the latches that depend from the display housing 40, for example, the latches shown in FIGS. 1–2 and 5A–5B, is that they can cover and protect the overhanging portion of display 45 when the latches are in the secured position.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A laptop computer housing, comprising:
    a base having a widthwise dimension, a first depthwise dimension and a thickness;
    a display housing pivotably coupled to the base and pivotable about a pivot axis relative to the base between a stowed position in which the display housing includes a first surface facing the base and an unstowed position in which the first surface of the display housing is accessible, the display housing having a widthwise dimension, a second depthwise dimension and a thickness, the second depthwise dimension of the display housing being greater than the first depthwise dimension of the base in a direction transverse to the pivot axis so that an overhanging portion of the display housing projects beyond the base when the display housing is in the stowed position; and
    a latch member coupled to at least one of the display housing or the base, the latch member having an engaging portion movable between a secured position and an unsecured position, and the engaging portion being removably engageable with the other of the display housing or the base when the latch member is in the secured position.

2. The laptop computer housing of claim 1 wherein the latch member includes an attachment portion adjacent the engaging portion, the attachment portion being slidably coupled to the display housing and slidable relative to the display housing and the base between the secured position and the unsecured position, the engaging portion being engaged with the base to restrict pivoting of the display housing away from the base when the latch member is in the secured position, and the engaging portion being disengaged from the base when the latch member is in the unsecured position.

3. The laptop computer housing of claim 1 wherein the latch member has an attachment portion adjacent the engaging portion, the attachment portion being pivotably coupled to the display housing to pivot relative to the display housing and the base between the secured position and the unsecured position.

4. The laptop computer housing of claim 3 wherein the display housing is pivotably coupled to the base proximate to a first edge of the display housing and the latch member is pivotably coupled to the display housing proximate to a second edge of the display housing generally opposite the first edge of the display housing.

5. The laptop computer housing of claim 1 wherein the latch member is pivotably coupled to the base and the engaging portion of the latch member is a first engaging portion, the display housing having a second engaging portion that is engaged with the first engaging portion when the display housing is in the stowed position and the latch member is in the secured position.

6. The laptop computer housing of claim 5 wherein the engaging portion of the display housing includes a projection projecting away from the display housing and the engaging portion of the latch member has an opening configured to removably receive the projection when the latch member is in the secured position.

7. The laptop computer housing of claim 1 wherein the display housing has a forward edge extending in a widthwise direction generally parallel to the widthwise dimension of the display housing and the latch member includes an attachment portion adjacent to the engaging portion, the attachment portion being pivotably attached to the display housing proximate to the forward edge of the display housing.

8. The laptop computer housing of claim 1 wherein the display housing has an aperture in a side surface of the display housing and the latch member includes a contact portion accessible through the aperture in the display housing, further wherein the base has an opening in an upper surface of the base opposite the engaging portion of the latch member and the engaging portion of the latch member is received in the opening of the base when the display housing is in the stowed position and the latch member is in the secured position.

9. The laptop computer housing of claim 1 wherein the latch member is coupled to at least one of the display housing and the base, the engaging portion of the latch member includes a protrusion, and the other of the display housing and the base has an aperture configured to receive the protrusion when the latch member is in the secured position.

10. The laptop computer housing of claim 1 wherein the latch member includes a locking device to lock the latch member in at least one of the engaged and disengaged positions.

11. The laptop computer housing of claim 10 wherein the locking device includes a detent projecting away from the latch member and a corresponding detent aperture in the display configured to removably receive the detent.

12. A laptop computer housing, comprising:
a base having a widthwise dimension, a depthwise dimension and a thickness;
a display housing pivotably coupled to the base and pivotable about a pivot axis relative to the base between a stowed position in which the display housing includes a first surface facing the base and an unstowed position in which the first surface of the display housing is accessible, the display housing having a widthwise dimension, a depthwise dimension and a thickness, at least one of the depthwise dimension and the widthwise dimension of the display housing being greater than the corresponding depthwise or widthwise dimension of the base to define an overhanging portion of the display housing that projects beyond an underhanging portion of the base when the display housing is in the stowed position; and
a latch member coupled to at least one of the overhanging portion of the display housing and the underhanging portion of the base, the latch member having an engaging portion movable between a secured position and an unsecured position, and the engaging portion being removably engageable with the other of the overhanging portion of the display housing or the underhanging portion of the base when the latch member is in the engaged position.

13. The laptop computer housing of claim 12 wherein the latch member includes an attachment portion adjacent the engaging portion, the attachment portion being slidably coupled to the display housing and slidable relative to the display housing and the base between a secured position with the engaging portion engaged with the base to restrict pivoting of the display housing away from the base and an unsecured position with the engaging portion disengaged from the base.

14. The laptop computer housing of claim 12 wherein the latch member includes an attachment portion adjacent the engagement portion, the attachment portion being pivotably coupled to the display housing, the engaging portion of the latch member being engaged with a corresponding engaging portion of the base when the display housing is in the stowed position.

15. The laptop computer housing of claim 12 wherein the display housing is pivotably coupled to the base proximate to a first edge of the display housing and the latch member is pivotably coupled to the display housing proximate to a second edge of the display housing generally opposite the first edge of the display housing.

16. The laptop computer housing of claim 12 wherein the latch member is pivotably coupled to the base and the engaging portion of the latch member is a first engaging portion that is engaged with the first engaging portion when the display housing is in the stowed position and the latch member is in the secured position.

17. The laptop computer housing of claim 16 wherein the engaging portion of the display housing includes a projection projecting away from the display housing and the engaging portion of the latch member has an opening configured to removably receive the projection when the latch member is in the secured position.

18. The laptop computer housing of claim 12 wherein the display housing has a forward edge extending in a widthwise direction generally parallel to the widthwise dimension of the display housing and the latch member includes an attachment portion adjacent to the engaging portion, the attachment portion being pivotably attached to the display proximate to the forward edge of the display.

19. The laptop computer housing of claim 12 wherein the display housing has an aperture in a side surface of the display housing and the latch member includes a contact portion accessible through the aperture in the display housing, further wherein the base has an opening in an upper surface of the base opposite the engaging portion of the latch member and the engaging portion of the latch member is received in the opening of the base when the display housing is in the stowed position and the latch member is in the secured position.

20. The laptop computer housing of claim 12 wherein the latch member is coupled to at least one of the display housing and the base, the engaging portion of the latch member includes a protrusion, and the other of the display housing and the base has an aperture configured to receive the protrusion when the latch member is in the secured position.

21. The laptop computer housing of claim 12 wherein the latch member includes a locking device to lock the latch member in at least one of the secured and unsecured positions.

22. A laptop computer housing, comprising:
 a base having a widthwise dimension, a first depthwise dimension generally transverse to the widthwise dimension and a thickness generally transverse to the widthwise dimension and the depthwise dimension;
 a display housing pivotably coupled to the base and pivotable about a pivot axis relative to the base between a stowed position wherein the display housing faces the base and an unstowed position wherein the display housing is accessible, the display housing having a widthwise dimension generally parallel to the widthwise dimension of the base, a second depthwise dimension generally parallel to the first depthwise dimension of the base and a thickness generally parallel to the thickness of the base, the second depthwise dimension of the display housing being greater than the first depthwise dimension of the base in a direction transverse to the pivot axis so that the display housing overhangs the base when the display housing is in the stowed position; and
 a latch member slidably coupled to the display housing and slidable relative to the display housing and the base between a secured position and an unsecured position, the latch member having an engaging portion releasably engaged with the base when the latch member is in the secured position and the display is in the stowed position.

23. The laptop computer housing of claim 22 wherein the engaging portion has a protrusion and the base has an opening, the opening being configured to receive the protrusion when the latch member is in the secured position.

24. The laptop computer housing of claim 22 wherein the display housing includes a guide and the latch member is slidably engaged with the guide to move between the secured position and the unsecured position.

25. The laptop computer housing of claim 22 wherein the latch member is slidable in a direction generally parallel to the depthwise dimension of the display housing between the secured and the unsecured positions.

26. The laptop computer housing of claim 22 wherein the latch member is slidable in a direction generally parallel to the widthwise dimension of the display housing between the secured and the unsecured positions.

27. The laptop computer housing of claim 26 wherein the latch member is a first latch member and the direction is a first direction generally parallel to the widthwise direction of the display housing, further comprising a second latch member slidable in a second direction generally parallel to the widthwise dimension of the display housing.

28. The laptop computer housing of claim 22 wherein the latch member includes a grip portion having a textured surface to engage a human finger.

29. A laptop computer housing, comprising:
 a base having a widthwise dimension, a first depthwise dimension and a thickness;
 a display housing pivotably coupled to the base and pivotable about a pivot axis relative to the base between a stowed position in which the display housing includes a first surface facing the base, and an unstowed position in which the display housing is accessible, the display housing having a widthwise dimension, a second depthwise dimension and a thickness, the second depthwise dimension of the display housing being greater than the first depthwise dimension of the base in a direction transverse to the pivot axis so that the display housing overhangs the base when the display housing is in the stowed position; and
 a latch member rotatably coupled to the display housing and rotatable relative to the display housing and the base between a secured position and an unsecured position, the latch member having an engaging portion releasably engaged with the base when the latch member is in the secured position and the display housing is in the stowed position.

30. The laptop computer housing of claim 29 wherein the display housing has a forward edge and a rear edge opposite the forward edge, the display housing being pivotably coupled to the base proximate to the rear edge of the display housing, the display housing further having a display between the forward edge and the rear edge, the latch member being pivotably coupled to the display housing proximate to the forward edge of the display housing.

31. A laptop computer, comprising:
 a base having a widthwise dimension, a first depthwise dimension and a thickness;
 a display housing having a display and being pivotably coupled to the base and pivotable about a pivot axis relative to the base between a stowed position in which the display faces the base and an unstowed position in which the display is accessible, the display housing having a widthwise dimension, a second depthwise dimension and a thickness, the second depthwise dimension of the display housing being greater than the first depthwise dimension of the base in a direction transverse to the pivot axis so that an overhanging portion of the display housing projects beyond the base when the display housing is in the stowed position;
 a latch member coupled to at least one of the display housing or the base, the latch member having an engaging portion movable between a secured position and an unsecured position, and the engaging portion being removably engageable with the other of the display housing or the base when the latch member is in the secured position;
 a processor and a memory device coupled to at least one of the base and the display housing; and
 an input device coupled to the processor for transmitting signals to the processor.

32. The laptop computer of claim 31 wherein the latch member includes an attachment portion adjacent the engaging portion, the attachment portion being slidably coupled to the display housing and slidable relative to the display housing and the base between the secured position and the unsecured position, the engaging portion being engaged with the base to restrict pivoting of the display housing away from the base when the latch member is in the secured position, and the engaging portion being disengaged from the base when the latch member is in the unsecured position.

33. The laptop computer of claim 31 wherein the latch member has an attachment portion adjacent the engaging portion, the attachment portion being pivotably coupled to the display housing to pivot relative to the display housing and the base between the secured position and the unsecured position.

34. The laptop computer of claim 31 wherein the latch member is pivotably coupled to the base and the engaging portion of the latch member is a first engaging portion, the display housing having a second engaging portion that is engaged with the first engaging portion when the display housing is in the stowed position and the latch member is in the secured position.

35. The laptop computer of claim 34 wherein the engaging portion of the display housing includes a projection projecting away from the display housing and the engaging portion of the latch member has an opening configured to removably receive the projection when the latch member is in the secured position.

36. The laptop computer of claim 31 wherein the display housing has an aperture in a side surface of the display housing and the latch member includes a contact portion accessible through the aperture in the display housing, further wherein the base has an opening in an upper surface of the base opposite the engaging portion of the latch member and the engaging portion of the latch member is received in the opening of the base when the display housing is in the stowed position and the latch member is in the secured position.

37. The laptop computer of claim 31 wherein the latch member is coupled to at least one of the display housing and the base, the engaging portion of the latch member includes a protrusion, and the other of the display housing and the base has an aperture configured to receive the protrusion when the latch member is in the secured position.

38. A laptop computer housing, comprising:
 a base having a widthwise dimension, a first depthwise dimension, a thickness and a protrusion;
 a display housing pivotably coupled to the base and movable relative to the base between a stowed position in which the display housing includes a first surface facing the base and an unstowed position in which the first surface of the display housing is accessible, the display housing having a widthwise dimension, a second depthwise dimension and a thickness, the second depthwise dimension of the display housing being greater than the first depthwise dimension of the base so that an overhanging portion of the display housing projects beyond the base; and
 a latch member coupled to the display housing and having an engaging portion movable between a secured position and an unsecured position, and the engaging portion being removably engageable with the display housing when the latch member is in the secured position, the engaging portion having an opening in which the protrusion of the base is received when the latch member is in the secured position.

39. A laptop computer housing, comprising:
 a base having a widthwise dimension, a first depthwise dimension, a thickness and a protrusion;
 a display housing pivotably coupled to the base and movable relative to the base between a stowed position in which the display housing includes a first surface facing the base and an unstowed position in which the first surface of the display housing is accessible, the display housing having a widthwise dimension, a depthwise dimension and a thickness, at least one of the depthwise dimension and the widthwise dimension of the display housing being greater than the corresponding depthwise or widthwise dimension of the base to define an overhanging portion of the display housing that projects beyond an underhanging portion of the base; and
 a latch member coupled to the overhanging portion of the display housing, the latch member having an engaging portion movable between a secured position and an unsecured position, the engaging portion being removably engageable with the underhanging portion of the base when the latch member is in the engaged position, the engaging portion including an opening in which the protrusion of the base is received when the latch member is in the secured position.

40. A laptop computer housing, comprising:
 a base having a widthwise dimension, a first depthwise dimension generally transverse to the widthwise dimension and a thickness generally transverse to the widthwise dimension and the depthwise dimension, the base further having a protrusion;
 a display housing pivotably coupled to the base and movable relative to the base between a stowed position wherein the display housing faces the base and an unstowed position wherein the display housing is accessible, the display housing having a widthwise dimension generally parallel to the widthwise dimension of the base, a second depthwise dimension generally parallel to the first depthwise dimension of the base and a thickness generally parallel to the thickness of the base, the second depthwise dimension of the display housing being greater than the first depthwise dimension of the base; and
 a latch member slidably coupled to the display housing and slidable relative to the display housing and the base between a secured position and an unsecured position, the latch member having an engaging portion releasably engaged with the base when the latch member is in the secured position and the display is in the stowed position, the engaging portion of the latch member and the protrusion of the base being located at a common side of the laptop computer, the engaging portion having an opening configured to receive the protrusion of the base when the latch member is in the secured position.

41. A laptop computer housing, comprising:
 a base having a widthwise dimension, a first depthwise dimension and a thickness;
 a display housing pivotably coupled to the base and movable relative to the base between a stowed position in which the display housing includes a first surface facing the base, and an unstowed position in which the display housing is accessible, the display housing having a widthwise dimension, a second depthwise dimension and a thickness, the second depthwise dimension of the display housing being greater than the first depthwise dimension of the base; and
 a latch member rotatably coupled to the display housing and rotatable relative to the display housing and the base between a secured position and an unsecured position, the latch member having an engaging portion extending across approximately the entire widthwise dimension of the display housing, the engaging portion releasably engaged with the base when the latch member is in the secured position and the display housing is in the stowed position.

42. A laptop computer housing, comprising:

a base having a widthwise dimension, a first depthwise dimension generally transverse to the widthwise dimension and a thickness generally transverse to the widthwise dimension and the depthwise dimension;

a display housing pivotably coupled to the base and movable relative to the base between a stowed position wherein the display housing faces the base and an unstowed position wherein the display housing is accessible, the display housing having a widthwise dimension generally parallel to the widthwise dimension of the base, a second depthwise dimension generally parallel to the first depthwise dimension of the base and a thickness generally parallel to the thickness of the base, the second depthwise dimension of the display housing being greater than the first depthwise dimension of the base; and a latch member slidably coupled to the display housing and slidable relative to the display housing and the base between a secured position and an unsecured position, the latch member having an engaging portion releasably engaged with the base when the latch member is in the secured position and the display is in the stowed position, the latch member extending over a portion of the display housing and having an access hole through which the portion of the display housing is accessible.

43. A laptop computer housing, comprising:

a base having a widthwise dimension, a first depthwise dimension generally transverse to the widthwise dimension and a thickness generally transverse to the widthwise dimension and the depthwise dimension;

a display housing having a display, the display housing being pivotably coupled to the base and movable relative to the base between a stowed position wherein the display housing faces the base and an unstowed position wherein the display housing is accessible, the display housing having a widthwise dimension generally parallel to the widthwise dimension of the base, a second depthwise dimension generally parallel to the first depthwise dimension of the base and a thickness generally parallel to the thickness of the base, the second depthwise dimension of the display housing being greater than the first depthwise dimension of the base; and a latch member slidably coupled to the display housing and slidable relative to the display housing and the base between a secured position with the latch member configured to extend over at least a portion of the display and an unsecured position with the latch member exposing the portion of the display, the latch member having an engaging portion releasably engaged with the base when the latch member is in the secured position and the display is in the stowed position.

44. A laptop computer housing, comprising:

a base having a widthwise dimension, a first depthwise dimension, a thickness and a protrusion;

a display housing pivotably coupled to the base and movable relative to the base between a stowed position in which the display housing includes a first surface facing the base, and an unstowed position in which the display housing is accessible, the display housing having a widthwise dimension, a second depthwise dimension and a thickness, the second depthwise dimension of the display housing being greater than the first depthwise dimension of the base; and a latch member rotatably coupled to the display housing and rotatable relative to the display housing and the base between a secured position and an unsecured position, the latch member having an engaging portion releasably engaged with the base when the latch member is in the secured position and the display housing is in the stowed position, the engaging portion having an opening configured to receive the protrusion of the base when the latch member is in the secured position.

45. A laptop computer housing, comprising:

a base having a widthwise dimension, a first depthwise dimension and a thickness;

a display housing having a display and being pivotably coupled to the base and movable relative to the base between a stowed position in which the display housing includes a first surface facing the base, and an unstowed position in which the display housing is accessible, the display housing having a widthwise dimension, a second depthwise dimension and a thickness, the second depthwise dimension of the display housing being greater than the first depthwise dimension of the base; and a latch member rotatably coupled to the display housing and rotatable relative to the display housing and the base between a secured position with the latch member configured to extend over at least a portion of the display and an unsecured position with the latch member exposing the portion of the display, the latch member having an engaging portion releasably engaged with the base when the latch member is in the secured position and the display housing is in the stowed position.

* * * * *

UNITED STATES PATENT AND TRADEMARK OFFICE
CERTIFICATE OF CORRECTION

PATENT NO.     : 6,201,688 B1
DATED          : March 13, 2001
INVENTOR(S)    : Leman It is certified that error appears in the above-identified patent and that said Letters Patent is hereby corrected as shown below:

<u>Title page,</u>
Item [73], Assignee, "Micron Electronics, Inc., Nampa, ID (US)" should be
-- Micron Technology, Inc., Boise, ID (US) --;

Signed and Sealed this

Twentieth Day of May, 2003

JAMES E. ROGAN
*Director of the United States Patent and Trademark Office*